United States Patent Office 2,898,325
Patented Aug. 4, 1959

2,898,325

RESINS FROM STEAM-CRACKED STREAMS CO-POLYMERIZED WITH FULVENE-TYPE COMPOUNDS

James V. Fusco, Fanwood, and Stanley B. Mirviss, Roselle, N.J., assignors to Esso Research and Engineering Company, a corporation of Delaware No Drawing. Application August 2, 1954
Serial No. 447,422

9 Claims. (Cl. 260—82)

This invention relates to a novel process for improving the quality of petroleum hydrocarbon resins and, more particularly, to a process in which petroleum resins are improved by the addition to the feed streams of limited amounts of fulvene-type compounds or streams containing the same.

Hydrocarbon resins can be produced from certain unsaturated petroleum refinery streams containing mixtures of olefins and diolefins by such methods as polymerization using Friedel-Crafts catalysts. The steam-cracked distillates have been found especially useful for this purpose.

Such distillates are prepared by cracking petroleum fractions as kerosene, gas oil, naphtha or residua in the presence of 50 to 90 mole percent steam at temperatures of about 1000° F. to 1600° F. The liquid cut boiling largely below $C_9$ is segregated and is preferably heated at about 90 to 140° C. to dimerize cyclopentadienes. After the dimerization, a $C_8$ to $C_9$ and lighter liquid cut including $C_5$ is taken overhead and there is separated a dimer concentrate as bottoms. This overhead stream may, if desired, be topped to about 38° C. to remove the isoprene-containing fraction. The stream obtained boiling from 20 to about 170° C., or selected portions thereof, is used as the basic polymerization feed.

It has now been found, however, that if a quantity of a fulvene-type compound or a concentrate thereof is added to the feed streams and the polymerization is carried out on the resulting blends, improved resins of considerably higher softening points are obtained. The resins obtained have higher softening points than are realized when the fulvene-type compound is not present in the reaction mixture. The resin products contain no insoluble gel except in cases of very reactive fulvenes, such as dimethyl fulvene, where gel is formed at high concentrations of the fulvene. However, the formation of gel can be eliminated even in this case by special polymerization techniques as shown below.

The total resin feed consists of blends of from 98 to 75 parts of a steam-cracked distillate boiling in the range of 20 to 170° C., or fractions thereof, and 2 to 25 parts of a hydrocarbon solution containing 10–100% of a fulvene-type compound. The amount of the aromatic fraction used must be adjusted so as to give: (1) a polymerization feed containing 2 to 25% fulvene and (2) less than 20% of liquid polymer under the stripping conditions specified.

Fulvene type compounds are prepared by reacting ketones or aldehydes with cyclic compounds containing active methylene groups, such as in cyclopentadienes, in the presence of a basic catalyst such as an alkali alcoholate solution in alcohol. For example, dimethyl fulvene is prepared from acetone and cyclopentadiene in accordance with the following reaction:

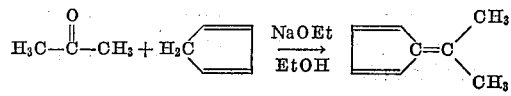

Other fulvene-type compounds can be prepared by reacting ketones with alkylated derivatives of cyclopentadiene, e.g. methyl and dimethyl cyclopentadiene. Likewise unsaturated aldehydes and ketones may be used in place of the acetone.

An aromatic fulvene, such as the dimethyl fulvene of indene, can be prepared in a similar manner by reacting acetone with indene in the presence of sodium methoxide and methanol:

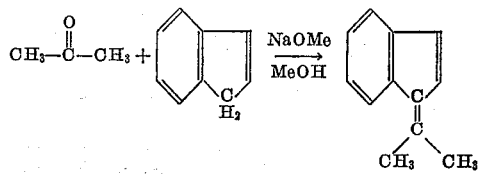

Other aldehydes or ketones may be used such as methyl ethyl ketone, an aromatic aldehyde or ketone, such as benzaldehyde or acetophenone, or an unsaturated aldehyde or ketone such as methyl vinyl ketone, or acrolein, or cinnamaldehyde.

For increasing the resin yield it is preferable that a minimum of 2.0% of the fulvene compound be used based on the total feed. The increased yield of resin and the resin softening point are dependent on the amount and type of fulvene used. Based on equivalent resin softening points of 90° C., the net increase in resin yield above that yield obtained when the fulvene is not present amounts to 120 to 300% of the amount of fulvene added to the feed. Although it is not intended to limit the good results of this invention to any theory, it seems that the fulvene-type compound copolymerizes with some of the less reactive components of the feed. This behavior is probably due to the triene and/or diene system present in the fulvene-type compound. The resin softening point is increased from 90° C. to >100° C. (up to 157° C.) depending on the amount of fulvene-type compound added. By comparison and under similar reaction conditions, styrene produces increases in resin yield but never more than that corresponding to the amount of styrene added. In addition styrene causes a decrease in resin softening point.

In addition to the above advantages of this invention, the presence of the fulvene compound causes a decrease in the unsaturation of the resin. For many uses as in floor tile formulations, petroleum resins of low resin unsaturation are very advantageous.

Hydrocarbon resin processes to which the present invention is applicable are carried out by treating a hydrocarbon mixture containing diolefins, olefins, aromatics, paraffins, and naphthenes with about 0.25 to 3.5%, based on the unsaturated hydrocarbon feed, of an aluminum halide catalyst such as aluminum chloride or aluminum bromide. The catalysts may be used as solids or they may be employed as solutions, slurries or complexes. Hydrocarbon complexes of the catalysts, obtained by reaction of the aluminum halide with a resin raffinate containing about 60% olefins and 40% aromatics, are also quite useful.

Typical hydrocarbon fractions useful for feeds in making these resins, boil from 20° to 170° C. Analyses show the following composition:

| | Wt. Percent | Fraction, ° C. |
|---|---|---|
| Distillation Range | 0–60 | 20–70 |
| | 65–40 | 70–130 |
| | 35–0 | 130–170 |
| Composition: | | |
| Diolefins | 10–25 | |
| Aromatics | 20–50 | |
| Olefins | 66–24 | |
| Paraffins | 4–1 | |

The polymerization reactions are conducted at temperatures in the range of −30 to +85° C., and preferably from −15 to +70° C. Generally, the amount of fulvene-containing material added should be restricted to correspond or be equivalent to from 2% up to not more that 25% of fulvene based on the total feed mixture. Subject to this limitation, the fulvene may be used as a concentrate of 10% or higher purity.

In carrying out the polymerization, either batch or continuous operations may be employed. The reaction is carried out in one or more stages within a period of 0.25 to 1.5 hours. The resin formed may be recovered by water and/or alkali washing to remove catalyst followed by stripping off the unpolymerized material. One good way to remove the halide catalyst is to add methyl alcohol to form a solid complex, which is then filtered off. The resin stripping is carried to 250° C. still bottoms temperature at atmospheric pressure to remove unpolymerized materials. To recover the liquid polymer ($C_{10}$+polymer or "fill"), the stripping is then continued with superheated steam or at 3–5 mm. Hg pressure to a maximum bottoms temperature of 260–270° C.

The invention is described in more complete detail by the following examples although it is not intended to limit the scope of the invention thereto.

EXAMPLE 1

Varying amounts of dimethyl fulvene were added to a steam cracked naphtha stream having the following boiling range and composition:

Boiling range 40–145° C.:
- About 16% diolefins_____ 20% $C_5$ hydrocarbons.
- 29% aromatics_____ 24% $C_6$ hydrocarbons.
- 53% olefins_____ 40% $C_7$ hydrocarbons.
- 2% paraffins_____ 16% $C_8$ and $C_9$ hydrocarbons.

The resulting mixtures were polymerized with 0.5 to 3.0 wt. percent $AlCl_3$ or $AlBr_3$ catalyst at −10 to 55° C. polymerization temperature.

The $AlCl_3$ or $AlBr_3$ catalyst was added to the feed over a period of 30 minutes with agitation and occasional cooling to maintain the temperature at approximately 25±5° C. or some other temperature given in the table below. After catalyst addition, the reaction mixture was allowed to age an additional 30 minutes, at the end of which time it was quenched and washed with water followed by another wash with an aqueous salt solution. The washed polymerizate was then stripped to 250° C. bottoms temperature. The distillate (unreacted feed) was rejected and the polymer bottoms was further stripped to 270° C. at 3 mm. Hg pressure. The distillate collected during the vacuum distillation is low molecular weight polymer and is referred to as "fill" material. The material left in the pot is resinous product. The data are shown in Table I.

Table I.—Copolymerization of fulvene with steam cracked streams

| Feed | Wt. Percent $AlCl_3$ | Yields, Wt. Percent, on Feed | | Actual S.P.ᵍ | Est. Wt. Percent Yield, 90° C. S.P. Resin ᵃ | Contribution based on DMF added,ᵉ percent | ASTM Iodine No. ʰ |
|---|---|---|---|---|---|---|---|
| | | Resin ᵈ | Fill | | | | |
| Steam Cracked Naphtha (A) | 1.0 | 34.0 | 4.4 | 86 | 32.8 | | 200 |
| 97.5% A + 2.5% DMF ᵇ | 1.0 | 34.0 | 4.8 | 105 | 39.4 | 296 | 200 |
| 95% A + 5% DMF | 1.0 | 35.0 | 4.8 | 111 | 43.2 | 240 | 198 |
| 90% A + 10% DMF ᶜ | 1.0 | 38.2 | 4.3 | 121 | 53.1 | 235 | 187 |
| 95% A + 5% DMF | 0.5 | 30.4 | 2.3 | 111.5 | 37.8 | | |
| 95% A + 5% DMF ᵏ | 3.0 | 37.2 | 3.3 | 104 | 43.8 | 252 | |
| 95% A + 5% DMF | *1.0 | 34.0 | 3.0 | 111.5 | 42.3 | 222 | |
| 80% A + 20% DMF ˡ | 1.0 | ʲ38.1 | 6.0 | 157.0 | (ⁱ) | | |
| 90% A + 10% Styrene | 1.0 | 41.3 | 7.2 | 80.0 | 37.5 | ᶠ 80 | |

*$AlBr_3$.
ᵃ Yields of resin corrected to 90° C. soft. pt. using equation:

$$Y_2 = Y_1 \left( \frac{1-0.01(S.P._2-100)}{1-0.01(S.P._1-100)} \right)$$

$Y_1$ = Yield at higher soft. pt., S.P.₁.
ᵇ DMF—dimethyl fulvene.
ᶜ DMF was added after $AlCl_3$ to prevent gel, insoluble polymer, formation.
ᵈ Resin obtained by stripping to 270° C. btms. temp. at 3–4 mm. Hg pressure.
ᵉ Contribution to 90° C. soft. pt. resin yield based on DMF added.
ᶠ Contribution to 90° C. soft. pt. resin yield based on styrene added.
ᵍ ASTM E28–51T.
ʰ ASTM D555–47.
ⁱ Equation does not hold for this high soft. pt.
ʲ In addition 6.7% gel formed. May be prevented by adding DMF after $AlCl_3$ (as in footnote c). Resin yield then increases by this amount of polymer at the same soft. pt., i.e. 44.8% resin yield at >150° C. soft. pt.
ᵏ Polymerization temperature of −10° C.
ˡ Polymerization temperature of 55–60° C.

Included in Table I are calculated yields of resins based on a common 90° C. resin softening point for comparison of polymer yields. This comparison was made using an equation shown in Table I which has been found by experiment to express the effect of unstripped fill in resin on the resin softening point. Thus, the more fill left in the resin, by not stripping so severely, the higher the resin yield and the lower the resin softening point.

It can be seen from the above table that through the addition of DMF (dimethyl fulvene) to the feed, increases in resin yields and softening points are obtained. The increase in resin yield, equivalent to about 200% to 300% of the added fulvene, is an indication that the DMF is copolymerizing with the less active constituents of the feed and yielding a polymer of higher softening point, or conversely more polymer of a given softening point. Consequently, adjusting to 90° C. softening points means that the yield of liquid polymer (fill material) is decreased and resin yield increased, when DMF is present, by a less severe stripping in product recovery. To obtain a 90° C. softening point, it may sometimes be necessary to include some of the unreacted materials. Thus, the fill is utilized in raising resin yield at a lower softening point level, e.g. a softening point of 121° C. down to 90° C., which is still a utilizable softening point resin. Ignoring softening point differences, the increase in resin yield is still substantial.

It should be noted that at higher concentrations, 10% and greater of DMF, small amounts of insoluble polymer, gel, were obtained. This is avoided, however, by adding the DMF after adding substantially all of the $AlCl_3$ catalyst to the steam-cracked naphtha. When 10 wt. percent DMF was added after catalyst addition there was even a larger increase in resin yield, equivalent to the gel yield otherwise obtained.

EXAMPLE 2

Varying amounts of the dimethyl fulvene of indene were added to a $C_5$—160° C. steam-cracked distillate having the following composition:

- 19% diolefins
- 52% olefins
- 27% aromatics
- 2% saturates
- 22% $C_5$ hydrocarbons.
- 18% $C_6$ hydrocarbons.
- 37% $C_7$ hydrocarbons.
- 23% $C_8$ and $C_9$ hydrocarbons.

The resulting mixtures were polymerized with 1 wt. percent aluminum chloride catalyst. Two additional runs were made, one with a higher aluminum chloride concentration (3.0%) and the other with aluminum bromide as the catalyst at a lower concentration (0.5%). The polymerization temperature was varied from −10 to 55° C. The reaction was carried out and the product worked up as in Example 1. The data are shown in Table II.

*Table II.—Copolymerizations of $C_5$—120° C. steam-cracked distillate with dimethyl indene fulvene*

| Feed | Wt. Percent on Feed | | | | Soft. Pt.[c] | Contribution to Resin, Wt. Percent of Added DMIF |
|---|---|---|---|---|---|---|
| | AlCl₃ | Resin [a] | Fill | Resin, 90° Soft. Pt.[b] | | |
| Steam Cracked Naptha (B) (Control) | 1.0 | 34.0 | 6.6 | 34.3 | 90.7 | |
| 95% (B) + 5% DMIF [d] | 1.0 | 39.3 | 4.0 | 39.3 | 90 | 134 |
| 90% (B) + 10% DMIF | 1.0 | 40.4 | 4.6 | 45.4 | 102 | 146 |
| 80% (B) + 20% DMIF | 1.0 | 41.8 | 4.7 | 55.4 | 117 | 140 |
| 90% (B) + 10% DMIF [e] | 3.0 | 43.1 | 11.7 | 49.5 | 104 | 187 |
| 90% (B) + 10% DMIF [f] | 0.5 AlBr₃ | 22.8 | 4.4 | 23.7 | 94 | |

[a] Resin obtained by stripping to 270° C. btms. temp. at 3–4 mm.
[b] Calculated using equation $$Y_2 = Y_1 \left( \frac{1-0.01(S.P._2-100)}{1-0.01(S.P._1-100)} \right)$$

$Y_1$=yield at higher soft. pt. S.P.₁; $Y_2$=yield 90°, S.P.₂=90° C.
[c] ASTM E28–51T.
[d] Dimethyl indene fulvene.
[e] Polymerization temp., 55° C.
[f] Polymerization temp., −10° C.

The addition of 5 to 20 wt. percent of dimethyl indene fulvene results in increased yields of resin equivalent to 135 to 145 percent of the added fulvene (on a 90° C. softening point basis). This is an indication that the fulvene is reacting with some of the less reactive components of the feed to give high resin yields and high softening points. "Fill" material, low molecular weight polymer, can be utilized in bringing the softening point of the resulting resin from about 105 to 115° C. to 90° C. thus minimizing the fill yield and maximizing the utilizable resin yield. Ignoring softening point differences, there is still a substantial increase in resin yield.

In all polymerizations with dimethyl indene fulvene no gel, insoluble polymer, was obtained. Resin colors appear to be about the same as the control.

EXAMPLE 3

A mixture of 95% steam-cracked naphtha and 5% of the fulvene of indene and benzaldehyde (8-phenyl-benzofulvene) was treated with AlCl₃. After washing with water and removal of unreacted materials, a resinous polymer remained. No insoluble polymer or gel was formed.

EXAMPLE 4

A mixture of 90% steam-cracked naphtha and 10% of the fulvene from indene and vinyl methyl ketone (8-methyl, 8-vinyl-benzofulvene) was treated with AlCl₃. After washing with water and removal of unreacted materials, a resinous polymer remained. No insoluble polymer or gel was formed.

The nature and objects of the present invention having been thus fully set forth and specific examples of the same given, what is claimed as new and useful and desired to be secured by Letters Patent is:

1. In the process for preparing solid petroleum resins comprising contacting, in a polymerization zone, a steam-cracked petroleum stream boiling in the range from about 20° to 170° C. and having the following composition:

| | Weight percent |
|---|---|
| Aromatics | 20–50 |
| Diolefins | 10–25 |
| Olefins | 66–24 |
| Paraffins | 4–1 | with an aluminum halide catalyst at a temperature between −30° and +85° C. for a period sufficient to form said petroleum resins; the improvement which comprises adding to said steam-cracked stream 2 to 25 weight percent of monomeric fulvenes, selected from the group consisting of fulvene, dialkyl fulvene, fulvene of indene, and dialkyl fulvene of indene, based on the total mixed streams, prior to polymerization.

2. A solid petroleum resin produced by the process of claim 1.

3. In the process for preparing solid petroleum resins comprising isolating a steam-cracked petroleum stream boiling in the range from about 20° to 170° C., said fraction being substantially below $C_9$, heating the steam-cracked stream to a temperature sufficient to dimerize substantially all the cyclopentadienes, stripping the resulting admixture to separate from the dimerized cyclopentadienes an overhead stream boiling in the range from about 20° to 170° C. and having the following composition:

| | Weight percent |
|---|---|
| Aromatics | 20–50 |
| Diolefins | 10–25 |
| Olefins | 66–24 |
| Paraffins | 4–1 | and contacting, in a polymerization zone, said overhead stream with an aluminum chloride catalyst at a temperature between −30° and +85° C. for a period sufficient to form said resins; the improvement which comprises adding to said overhead stream 2 to 25 weight percent of monomeric fulvenes, selected from the group consisting of fulvene, dialkyl fulvene, fulvene of indene, and dialkyl fulvene of indene, based on the total mixed streams, prior to polymerization, whereby the resin yield, based on a 90° C. resin softening point, is increased by 120 to 300% of the amount of fulvenes added.

4. A process according to claim 3 wherein the monomeric fulvenes are added after the addition of substantially all the aluminum chloride catalyst to said polymerization zone.

5. A process according to claim 3 wherein said overhead stream is fractionated to remove the isoprene-containing fraction boiling below 38° C. prior to polymerization.

6. A solid petroleum resin produced by the process of claim 5.

7. A process according to claim 3 wherein said fulvenes consist essentially of dimethyl fulvene.

8. A process according to claim 3 wherein said fulvenes consist essentially of dimethyl fulvene of indene.

9. A solid petroleum resin produced by the process of claim 7.

References Cited in the file of this patent

UNITED STATES PATENTS

| | | |
|---|---|---|
| 2,512,698 | Thompson | June 27, 1950 |
| 2,559,498 | Garber | July 3, 1951 |
| 2,720,479 | Crawford et al. | Oct. 11, 1955 |
| 2,750,360 | Moore | June 12, 1956 |